United States Patent [19]
Riordan et al.

[11] Patent Number: 4,837,794
[45] Date of Patent: Jun. 6, 1989

[54] FILTER APPARATUS FOR USE WITH AN X-RAY SOURCE

[75] Inventors: John C. Riordan, Carlsbad; Jay S. Pearlman, San Diego, both of Calif.

[73] Assignee: Maxwell Laboratories Inc., San Diego, Calif.

[21] Appl. No.: 660,447

[22] Filed: Oct. 12, 1984

[51] Int. Cl.[4] .............................................. G01N 23/20
[52] U.S. Cl. ...................................... 378/119; 378/34; 378/122
[58] Field of Search ........................ 376/143, 144, 145; 315/111.21, 111.71; 378/34, 143, 140, 34, 119, 122; 350/582

[56] References Cited

U.S. PATENT DOCUMENTS

| | | | |
|---|---|---|---|
| 2,453,163 | 11/1948 | Shurcliff . | |
| 2,901,631 | 8/1959 | Hansen et al. . | |
| 3,418,467 | 12/1968 | Spielberg et al. . | |
| 3,543,024 | 11/1970 | Kantor . | |
| 3,578,839 | 5/1971 | Riggle | 350/582 |
| 3,614,424 | 10/1971 | Openshaw . | |
| 3,679,927 | 7/1972 | Kirkendall | 378/140 |
| 3,969,629 | 7/1976 | McIntyre . | |
| 4,121,109 | 10/1978 | Taumann et al. . | |
| 4,184,078 | 1/1980 | Nagel et al. . | |
| 4,217,517 | 8/1980 | Delair et al. . | |
| 4,242,588 | 12/1980 | Silk et al. . | |
| 4,280,049 | 7/1981 | Werner et al. . | |
| 4,317,994 | 3/1982 | Mallozzi et al. . | |
| 4,408,338 | 10/1983 | Grobman | 378/34 |

FOREIGN PATENT DOCUMENTS

| | | | |
|---|---|---|---|
| 1442738 | 1/1970 | Fed. Rep. of Germany | 350/582 |
| 2044797 | 3/1972 | Fed. Rep. of Germany . | |
| 600479 | 10/1924 | France . | |

OTHER PUBLICATIONS

Pearlman et al., "X-Ray Lithography Using A Pulsed Plasma Source," *J. Vac. Sci. Technol,* vol. 19, No. 4, Nov./Dec. 1981, pp. 1190-1193.

J. D. Hares; A Simple CE X-Ray Source For Laser Plasma X-Ray Diagnostic Alignment; Nov. 1981; pp. 1306-1307.

*Primary Examiner*—Craig E. Church
*Attorney, Agent, or Firm*—Fitch, Even, Tabin & Flannery

[57] ABSTRACT

Filter apparatus for use in x-ray equipment including a repetitively pulsed x-ray source, a window for transmitting x-rays generated by the source to an object to be irradiated, and a vacuum chamber containing the x-ray source and the filter apparatus. The filter apparatus includes a baffle for diffusing hot gases and directing them away from the window. The filter apparatus further includes an ultraviolet light absorber which overlies the window with respect to the x-ray source whereby undesirable components generated with the x-rays by the x-ray source are substantially eliminated prior to reaching the window. Also disclosed is a method of eliminating undersirable by-products of x-ray generation.

14 Claims, 2 Drawing Sheets

FILTER APPARATUS FOR USE WITH AN X-RAY SOURCE

BACKGROUND OF THE INVENTION

The subject invention is directed to apparatus for filtering of undesirable components such as hot gases, charged particles and ultraviolet radiation, from the output of a pulsed plasma x-ray source.

In applications such as x-ray lithography, x-ray microscopy and materials evaluation, there is a need to eliminate undesirable components from the output of an x-ray source. By way of background with respect to lithography, presently integrated circuits are manufactured using ultraviolet light lithographic systems. In such systems, the circuit pattern is determined, and a mask is prepared in accordance with the pattern. The mask is a thin plate having transparent and opaque sections according to the pattern. Upon illumination of the mask with the ultraviolet light, an image is projected onto a silicon wafer having a photoresist coating. A relief pattern replicating the mask is provided upon chemical treatment to remove either the exposed or unexposed resist (depending upon the type of resist process employed). Subsequent etching, doping or metallization steps impart the desired electrical characteristics to the wafer, and the remaining resist is removed, resulting in the formation of one level of an integrated circuit.

Commercially available ultraviolet light lithography systems offer pattern resolution on the order of 1.5–2 microns. Such a level of resolution is adequate for the production of integrated circuits such as a 64K random-access memory; however, for still larger scale integrated circuitry, lithographic systems providing submicron pattern resolution are needed, if the products are to be kept small. An x-ray lithography system incorporating a pulsed plasma source provides the finer resolution desired. The system converts an electrical input to x-rays using the phenomenon of gas jet z-pinch. In this method of x-ray generation, a burst of a gas (such as nitrogen, krypton or argon) is expanded using a nozzle, in concert with the fast discharge of a capacitor bank through the expanding gas. A high current discharge generates an intense magnetic field which radially compresses the plasma. The result is a dense, high temperature plasma which is a very intense source of desirable x-rays with comparatively long wave lengths and hence low penetrating power (commonly known as soft x-rays). Unfortunately, generated along with the x-rays are hot gases, charged particles and utlraviolet light. These components must be removed to avoid overheating and degradation of components of the system and loss of the desired degree of pattern resolution.

One proposed x-ray lithography system employs arrays of vertical and horizontal grazing incidence mirrors between the r-ray source and the mask to substantially collimate soft x-rays from the source. This system incorporates filters for adjusting the intensity and spectrum of the output beam. For further information regarding the structure and operation of such an x-ray lithography system, reference may be made to U.S. Pat. No. 4,242,588.

SUMMARY OF THE INVENTION

Among the several aspects of the present invention may be noted the provision of improved apparatus for filtering from the output of a pulsed plasma x-ray source unwanted by-products which, if not removed, could damage components of the x-ray generation system and reduce the resolution resulting from the use of the x-ray equipment. The filter apparatus of the present invention functions to diffuse hot gases and direct them away from the x-ray exit window and to deflect charged particles away from the window. Furthermore, ultraviolet rays are absorbed from the x-ray output so that the output is primarily soft x-rays. The filter apparatus of the present invention has long service life, is reliable in use and is simple and economical to manufacture. Other aspects and features of the present invention will be, in part, apparent and, in part, pointed out hereinafter in the following specification and in the attendant claims and drawings.

Briefly, the filter apparatus of the present invention includes a baffle for directing hot gases away from the x-ray tranmsission window. Also included is a magnet for deflecting charged particles away from the window, with the baffle and the magnet defining a line of sight x-ray path between the x-ray source and window. The apparatus of the present invention further includes an ultraviolet light filter covering the window with respect to the x-ray source so that undesirable by-products generated with the x-rays by the x-ray source are substantially eliminated from the x-ray path.

As a method of eliminating undesirable by-products, the present invention includes several steps:

a. A baffle is placed adjacent to the x-ray source for deflecting hot gases away from the window.

b. A magnet is placed for providing a magnetic field to deflect charged particles from the window.

c. The window is covered with a filter section to absorb ultraviolet light.

d. The filter section is replaced with a fresh filter section after each operation of the x-ray source.

BRIEF DESCRIPTION OF THE DRAWINGS

Corresponding reference characters indicate corresponding components throughout the several views of the drawings.

DESCRIPTION OF THE PREFERRED EMBODIMENT

Figure 3:
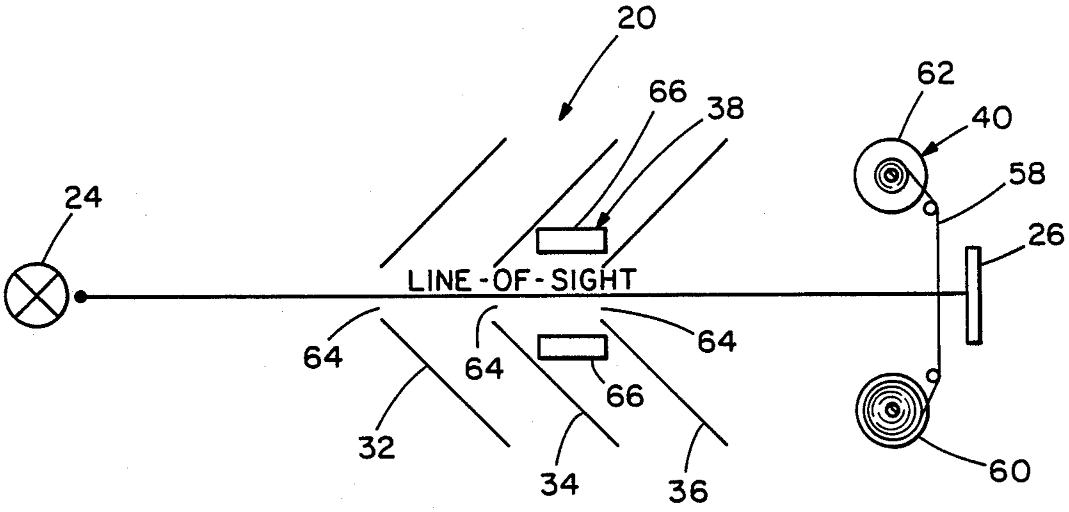
FIG. 3 is a diagrammatic representation of the filter apparatus of FIG. 1.

Referring now to the drawings, filter apparatus, for removing from the output of an x-ray generation system 22 unwanted by-products of that generation, is generally indicated by reference character 20. The x-ray generation system 22 includes a pulsed plasma x-ray source 24, a window 26 for transmitting the x-rays from the source 24 to object 28 to be irradiated, and a vacuum chamber 30 in which the x-ray source 24 is disposed and which is partially defined by the window 26. The filter apparatus 20, as best shown in FIG. 3, includes baffles 32, 34, 36 for diffusion hot gases and directing them away from the window, a magnet system 38 for creating a magnetic field to deflect charged particles (primarily electrons), and an ultraviolet absorption system 40 for absorbing ultraviolet radiation from the x-ray radiation impinging upon the object 28.

Figure 1:
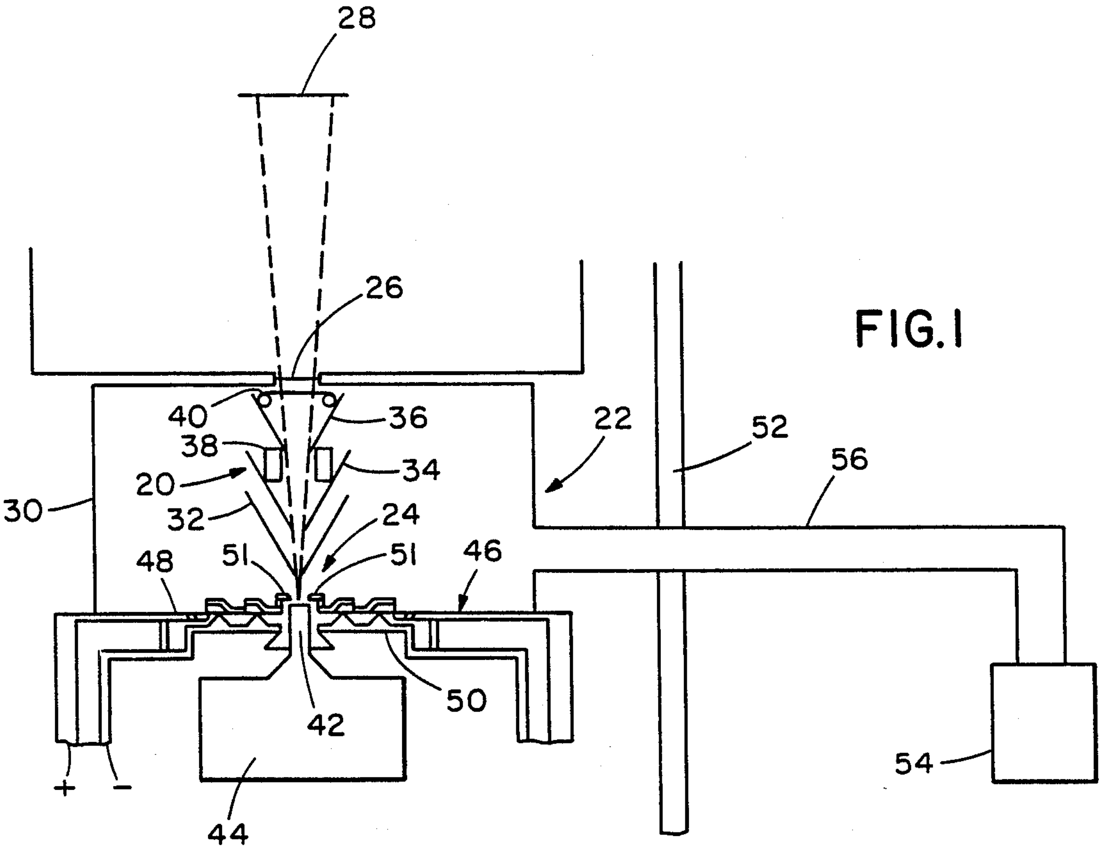
FIG. 1 is a diagrammatic representation of an x-ray generation system incorporating the filter apparatus of the present invention.

The x-ray generation system 22, which includes the filter apparatus 20 of the present invention is best shown in FIG. 1. The system 22 includes a nozzle 42 or injector connected to the exit port of a fast acting gas valve 44. Such a gas valve is more fully shown and discussed in commonly-assigned U.S. Patent Application Ser. No. 724,396, filed Apr. 18, 1985. A transmission line 46 includes upper and lower conductors 48, 50, respectively, each in the form of a circular plate. The lower conductor 50 holds the nozzle 42 while the upper conductor 48 supports electrodes 51 overlying the nozzle to act as an anode for the load which is constituted by a brief duration burst of gas from the nozzle. The lower conductor 50 is connected to the negative side of a high power, repetitively pulsed D.C. power supply (not shown), such as a fast discharge capacitor bank. The upper conductor 48 is connected to the positive side of the power supply to provide an electron current (hereafter "current") return path. Such a transmission line is more fully shown and discussed in commonly-assigned U.S. Pat. No. 4,578,805, issued Mar. 25, 1986.

Figure 2:
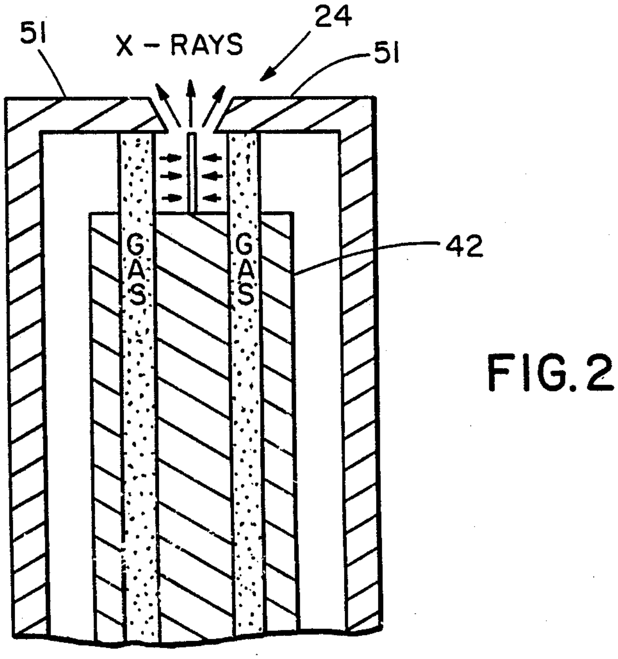
FIG. 2 is a sectional view illustrating a gas injector and electrodes for generating soft x-rays.

The main operating parts of the x-ray generation system may be located in a clean room having a wall 52, with one or more vacuum pumps 54 located outside the clean room and connected to the vacuum chamber 30 by means of a manifold 56. As suggested by FIG. 2, upon discharge of a fast discharge capacitor bank in synchronization with opening of the valve 44, high current flows through an expanding burst of gas (which may be, for example, nitrogen, krypton or argon), forming a plasma. As the current flows from the injector 42 (the cathode) to the electrodes 51, an intense azimuthal magnetic field is generated which radially compresses the plasma,a z-pinch. A large kinetic energy is acquired by the particles in the plasma during its rapid compression. This energy is thermalized as the plasma stagnates on its axis, resulting in the intense generation of soft x-rays. Additionally emitted as a result of the x-ray generation are unwanted hot gases, charged particles (primarily electrons), and ultraviolet light as well as other debris.

The window 26 is preferably formed of a thin sheet of beryllium which has high mechanical strength and, because of its low atomic number, good transmission characteristics with respect to soft x-rays. The absorption system 40, which protects the window 26 from ultraviolet radiation, includes a long thin strip of an ultraviolet light absorbing plastic film 58, such as a polyimide, which is wound on a feed spool 60. The leading end of the length of film is held by a take up spool 62 with the spools positioned so that a section of the material extends across the window 26 in the direct path from the x-ray source 24. After preferably each generation of x-rays, the film is advanced, so that a fresh (non-irradiated) film section is brought into registration with the window. It will be understood that the feed roll includes proper shielding to prevent premature irradiation of the film wound thereon. The spools are advanced after x-ray generation by means of a rotary drive (not shown) having a shaft extending through a seal in the wall of the vacuum chamber 30. Such rotary drives and seals thereof are well known to those of skilled in the art and need not be further discussed here.

Particularly in the use of the x-ray generation system 22 for lithography in manufacturing very large scale integrated circuits, it is necessary to substantially eliminate ultraviolet radiation from the soft x-ray output. If this is not done, the desirable submicron pattern resolution will not be attainable and the beryllium window could be damaged. Of course, the film 58 provides for substantial elemination of the ultraviolet light from the output. However, the film and the window, in turn, must be protected from hot gases and charged particles which are by-products of the x-ray generation. This is the function of the baffles 32–36 and of the magnet system 38.

Figure 4:
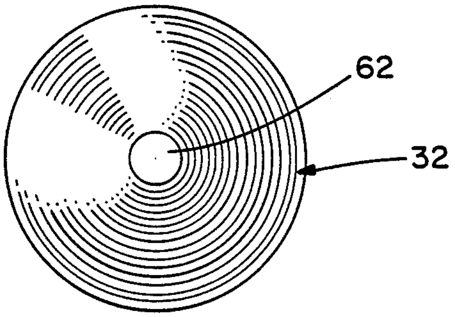
FIG. 4 is a plan viw of one of the baffles used in the filter apparatus of FIG. 3.

More specifically, each of the baffles is preferably generally conical, as shown in FIG. 4, with a central opening 64. The baffles are disposed in series between the x-ray source 24 and the window 26, with the several openings 64 in alignment and defining a line of sight x-ray path. The conical baffles preferably open at an angle of between 30 degrees and 60 with respect to the axis of the x-ray path, and most preferably, at 45 degrees. The baffle 32, closest the x-ray source, is preferably constructed of a refractory material which also is an absorber of soft x-rays, to limit the magnitude of the x-rays impinging on other components of the elimination apparatus. A preferred material for the first baffle is a tungsten alloy. The remaining baffles 34, 36 are spaced downstream of the first baffle and are preferably formed of aluminum or brass. The magnet system 38 preferably includes a plurality of permanent magnets 66 spaced about the x-ray path for deflecting charged particles away from the film and the window. System 30 constitutes a means for deflecting charged particles. However, an electrostatic system could also be employed for this purpose.

By way of example, a 25 micron thick ductile beryllium window provides adequate mechanical strength and transmits 62 percent of the 6.9 Angstrom soft x-rays generated using krypton as the gas.

Operation of the elimination apparatus of the present invention is as follows: Upon synchronized provision of a burst of gas from the nozzle and application of a high power DC pulse by the power supply, due to the phenomenon of gas jet z-pinch, x-rays are generated along with by-product ultraviolet radiation, hot gases and charged particles. The first baffle 32, while passing soft x-rays through its aperture or central opening 64, absorbs soft x-rays impinging on the surface of the baffle while at the same time diffusing expanding hot gases and directing them away from the line of sight between the x-ray source and the transmission window 26. The second and third baffles 34, 36 also function to further diffuse any hot gases still traveling towards the window thereby reducing the temperature to which the window and the film will rise. The magnets 66 operate to deflect the charged particles away from the film and the window. Finally, the ultraviolet light absorption film 58 eliminates about 98% of the ultraviolet light to substantially limit the output of the window to soft x-rays. The soft x-rays then pass to the object 28 for any one of the purposes described above. After each x-ray generation, the feed spool 60 and take-up spool 62 are advanced to bring a fresh section of the sacrificial plastic film in alignment with the window.

As a method of eliminating undesirable by-products of x-ray generation by a repetitively pulsed x-ray source aligned with a window for transmitting the x-rays, the present invention includes several steps:

(1) Hot gases caused by operation of the x-ray source are diffused and direct away from the window 26.

(2) Charged particles are deflected away from the window 26.

(3) The window is protected from ultraviolet radiation.

This last step includes the substeps of (a) covering the window with a section of ultraviolet radiation absorption material, and (b) periodically replacing the section.

In view of the above, it will be seen that the several objects of the invention are achieved and other advantageous results attained.

As various changes could be made without departing from the scope of the invention, it is intended that all matter contained in the above description shall be interpreted as illustrative and not in a limiting sense.

What is claimed is:

1. Filter apparatus in x-ray equipment including a plasma pinch x-ray source, a window for transmitting x-rays generated by the source to an object to be irradiated, and a vacuum chamber containing said x-ray source and said filter apparatus and with said window partially defining said vacuum chamber, said filter apparatus being disposed between said x-ray source and said window and comprising:

a plurality of baffles disposed in series between said x-ray source and said window for diffusing hot gases and directing them away from said window, each of said baffles having an opening with the openings defining a line of sight x-ray path between said source and said window; and means for absorbing ultraviolet light from the beam of x-rays passing through said window from said x-ray source such that undesirable components generated with the x-rays by said x-ray source are substantially eliminate prior to reaching said window.

2. Filter apparatus as set forth in claim 1 further comprising means for deflecting charged particles away from said window.

3. Filter apparatus as set forth in claim 1 wherein the baffle disposed closest said x-ray source is formed of a material which is an absorber of soft x-rays.

4. Filter apparatus as set forth in claim 1 wherein said means for absorbing includes a plurality of absorption sections only one of which at a time is between said source and said window and means for bringing a different absorption section into registration with said window.

5. Filter apparatus as set forth in claim 1 wherein said means for absorbing comprises a length of an ultraviolet absorption material mounted on spools.

6. Filter apparatus as set forth in claim 5 wherein said window is formed of beryllium.

7. Filter apparatus in x-ray equipment including a plasma pinch x-ray source, a window for transmitting x-rays generated by the source to an object to be irradiated, and a vacuum chamber containing said x-ray source and said filter apparatus and with said window partially defining said vacuum chamber, said filter apparatus being disposed between said x-ray source and said window and comprising:

a baffle for diffusing hot gases and directing them away from said window; and means for absorbing ultraviolet light from the beam of x-rays passing through said window from said x-ray source such that undesirable components generated with the x-rays by said x-ray source are substantially eliminated prior to reaching said window, wherein said baffle is disposed adjacent said x-ray source and is formed of a material which is an absorber of soft x-rays, wherein said baffle is generally conical, has an axis and has a central opening for forming a portion of said x-ray path.

8. Filter apparatus as set forth in claim 7 wherein the axis of the baffle coincides with that of said x-ray path and said baffle opens at an angle of between 30 degrees and 60 degrees with respect to the axis of the said x-ray path.

9. Filter apparatus in x-ray equipment including a plasma pinch x-ray source, a window for transmitting x-rays generated by the source, to an object to be irradiated, and a vacuum chamber containing said x-ray source and said filter apparatus and with said window partially defining said vacuum chamber, said filter apparatus being disposed between said x-ray source and said window and comprising:

a baffle for diffusing hot gases and directing them away from said window; and means for absorbing ultraviolet light from the beam of x-rays passing through said window from said x-ray source such that undesirable components generated with the x-rays by said x-ray source are substantially eliminated prior to reaching said window, further comprising means for deflecting charged particles way from said window, said baffle and said deflecting means defining a line of sight x-ray path between said x-ray source and said window, wherein said means for deflecting comprises at least one magnet disposed between said baffle and said means for absorbing.

10. Filter apparatus as set forth in claim 9 wherein said baffle is a first baffle and said filter apparatus includes a second baffle positioned downstream of said magnet and upstream of said means for absorbing.

11. Filter apparatus as set forth in claim 10 further comprising a third baffle located between said first baffle and said magnet.

12. Filter apparatus as set forth in claim 11 wherein said first baffle is made of a material, such as a tungsten alloy, which absorbs soft radiation, said second and third baffles being formed of a different material.

13. A method of filtering undesirable by-products of x-ray generation by an x-ray source aligned with a window for transmiting x-rays, said source being disposed in a vacuum chamber partially defined by said window, said method comprising:

(1) diffusing hot gases caused by operation of said x-ray source and directing them away from said window and further diffusing any hot gases still traveling towards said window through the use of a plurality of baffles disposed in series between said source and said window;

(2) deflecting charged particles away from said window; and (3) protecting said window from ultraviolet radiation.

14. A method as set forth in claim 13 wherein the step of protecting said window includes the substeps of (a) covering said window with an absortpion section and (b) periodically replacing the absorption section.

* * * * *

UNITED STATES PATENT AND TRADEMARK OFFICE

CERTIFICATE OF CORRECTION

PATENT NO. : 4,837,794

DATED : June 6, 1989

INVENTOR(S) : John C. Riordon, et al.

It is certified that error appears in the above-identified patent and that said Letters Patent is hereby corrected as shown below:

Face of Patent, Publications, change "Technol," to --Technol.,--.

Column 1, line 57, change "r-ray" to --x-ray--.

Column 2, line 47, change "viw" to --view--.

Column 3, line 64, change "thereof" to --therefor--.

Column 4, line 5, change "elemination" to --elimination--.

Column 4, line 17, after "60" insert --degrees--.

Column 4, line 68, change "direct" to --directed--.

Column 5, line 34, change "eliminate" to --eliminated--.

Column 6, line 15, after "source" delete the comma.

Column 6, line 49, change "transmiting" to --transmitting--.

Signed and Sealed this

Seventeenth Day of April, 1990

*Attest:*

HARRY F. MANBECK, JR.

*Attesting Officer*

*Commissioner of Patents and Trademarks*